United States Patent [19]
Althaus

[11] Patent Number: 5,617,718
[45] Date of Patent: Apr. 8, 1997

[54] GAS-TURBINE GROUP WITH TEMPERATURE CONTROLLED FUEL AUTO-IGNITION

[75] Inventor: Rolf Althaus, Kobe, Japan

[73] Assignee: Asea Brown Boveri AG, Baden, Switzerland

[21] Appl. No.: 414,742

[22] Filed: Mar. 31, 1995

[30] Foreign Application Priority Data

May 26, 1994 [CH] Switzerland ............................. 1630/94

[51] Int. Cl.⁶ ...................................................... F02C 3/14
[52] U.S. Cl. ............................................................ 60/39.17
[58] Field of Search ............................. 60/39.03, 39.07, 60/39.17

[56] References Cited

U.S. PATENT DOCUMENTS

| | | | |
|---|---|---|---|
| 2,115,112 | 4/1938 | Lysholm | 60/39.17 |
| 3,093,968 | 6/1963 | Osofsky | 60/39.17 |
| 3,255,586 | 6/1966 | Hennig et al. | 60/39.17 |
| 4,019,316 | 4/1977 | Pfefferle | 60/39.17 |
| 4,197,700 | 4/1980 | Jahnig | 60/39.17 |
| 4,270,342 | 6/1981 | Zaugg | 60/39.17 |
| 5,465,569 | 11/1995 | Althaus et al. | 60/39.03 |

FOREIGN PATENT DOCUMENTS

| | | |
|---|---|---|
| 0321809 | 6/1989 | European Pat. Off. . |
| 2830724 | 12/1979 | Germany . |
| 2953515A1 | 4/1982 | Germany . |
| 2254890C2 | 10/1982 | Germany . |

Primary Examiner—Michael Koczo
Attorney, Agent, or Firm—Burns, Doane, Swecker & Mathis, L.L.P.

[57] ABSTRACT

In a gas-turbine group which is operated with sequential combustion, preferably via two combustion chambers (4, 9) having in each case turbines arranged downstream, the temperature of the exhaust gases (8) from the first turbine (5) is recorded directly in front of the self-ignition point in the second combustion chamber (9) for the dosing of the fuel quantity for the first combustion chamber (4). The temperature is recorded by means of thermocouples (17) which are integrated in fuel lances (16) of the second combustion chamber (9), as a result of which influence is at the same time exerted on the fuel quantity (10) of this combustion chamber (9).

3 Claims, 2 Drawing Sheets

GAS-TURBINE GROUP WITH TEMPERATURE CONTROLLED FUEL AUTO-IGNITION

BACKGROUND OF THE INVENTION

1. Field of the Invention

The present invention relates to a method and apparatus for operating a gas turbine group with self-ignition of a fuel by monitoring working gas temperature.

2. Discussion of Background

In a gas-turbine group having sequential combustion, that is, for example, having two combustion chambers in which the one is arranged on the high-pressure side and the other is arranged on the low-pressure side, it is important that the metering of the two fuel quantities be controlled with the aid of temperature measurements. The temperatures of the hot gases from the respective combustion chambers should actually be measured in order to be able to exert appropriate influence on the fuel quantities. But in gas-turbine groups of the newer generation the hot-gas temperatures are quite high, regularly well above 1100° C., for which reason such temperature recording is difficult to carry out. In addition, the reproducibility of temperature measurement over time is also not ensured, for which reason reliable fuel control with the aid of such measurements is not guaranteed.

SUMMARY OF THE INVENTION

Accordingly, one object of the invention is, in the case of a method and a gas-turbine group of the type mentioned at the beginning, to carry out the recording of the temperatures indispensable for controlling the fuel quantities for the various combustion chambers at locations where reliable technical execution and repeatability are afforded.

The essential advantages of the invention can be seen in the fact that the control concept starts out from the prior art so that only the easily recorded temperature downstream of the high-pressure turbine has to be measured. The measurement of further parameters which may be necessary for controlling, for example, the process pressures is effected according to known principles, as have been disclosed by the prior art.

The method according to the invention starts out from the fact that the measurement of the temperature downstream of the high-pressure turbine directly indicates the temperature in the high-pressure combustion chamber. The fuel quantity for the high-pressure combustion chamber is therefore controlled directly on the basis of the temperature signal which is recorded in the low-pressure combustion chamber. At the same time, the recording of the temperature of the exhaust gases from the high-pressure turbine directly within the low-pressure combustion chamber indicates how the fuel control for the last-mentioned combustion chamber has to be manipulated, so that specific action can also be taken in respect of this firing. On the one hand, the high-pressure combustion chamber can be influenced by the temperature recording according to the invention; on the other hand, the fuel quantity for the operation of the low-pressure combustion chamber can also be controlled.

This is of importance in particular for sequentially operated combustion, in which the low-pressure combustion chamber is operated according to a self-ignition process. In such a configuration, the minimum requisite temperature of the exhaust gases for initiating the self-ignition must be maintained.

Advantageous and convenient further developments of the achievement of the object according to the invention are defined in the further dependent claims.

In the following text an exemplary embodiment of the invention is explained in more detail on the basis of the drawings. All elements not essential for directly understanding the invention have been omitted and the direction of flow of the media is indicated by arrows.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENT

Figure 1:
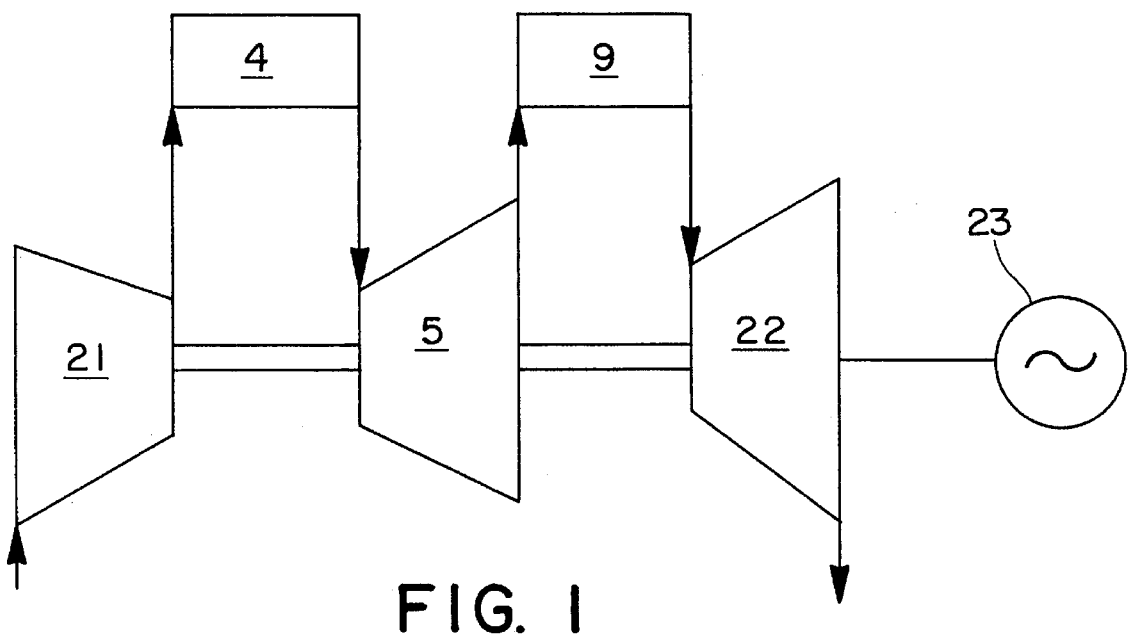
FIG. 1 is a schematic showing a gas turbine apparatus in accordance with the invention.
Figure 2:
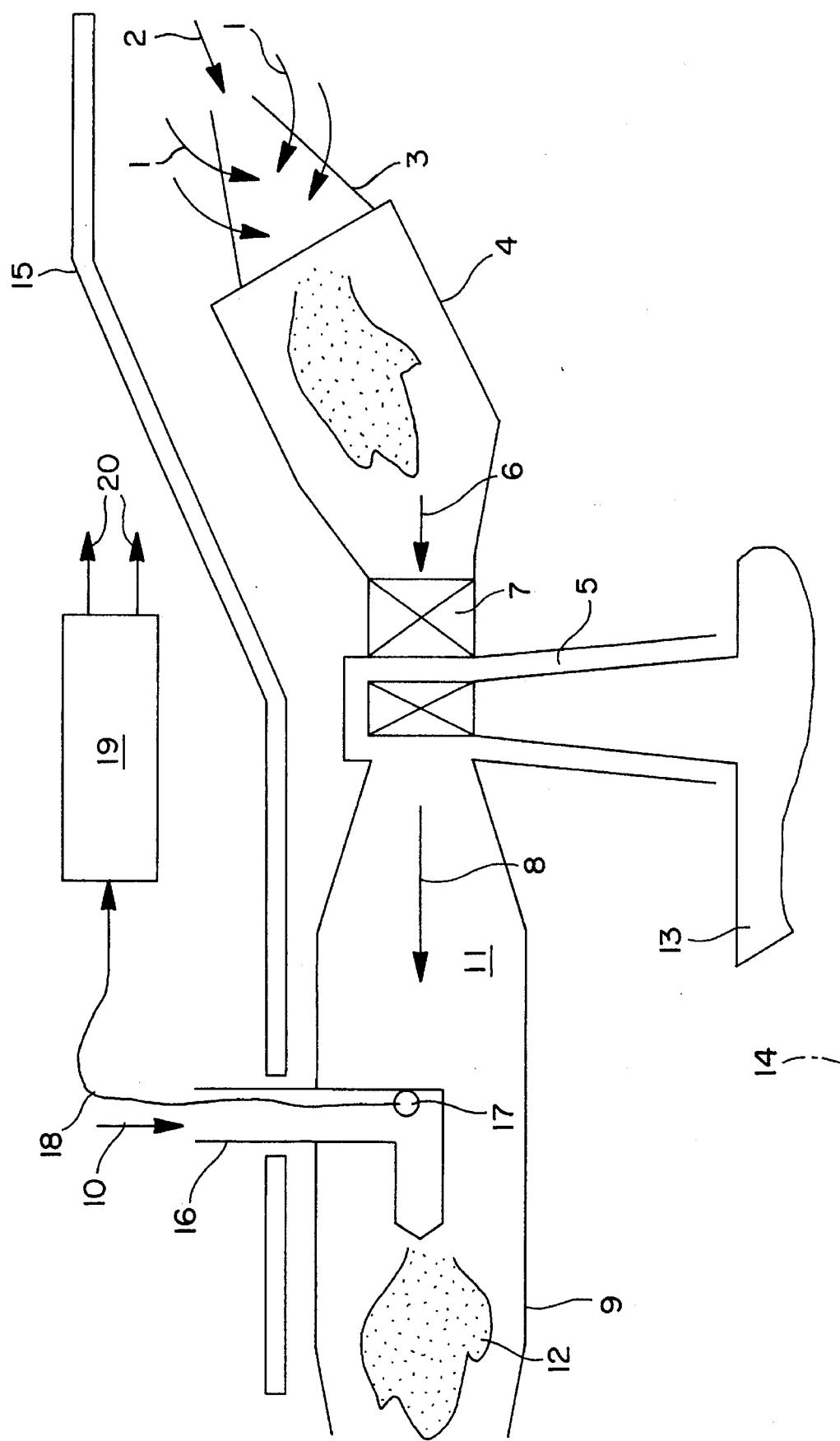
FIG. 2 shows a part of a gas-turbine group having sequential combustion.

Referring now to the drawings, wherein like reference numerals designate identical or corresponding parts throughout the several views, FIG. 1 shows a gas turbine group including a compressor 21, a high pressure combustion chamber 4, a high pressure turbine 5, a low pressure combustion chamber 9 for self-ignition of a fuel, and a low pressure turbine 22. A generator 23 is connected to be driven by the turbines. FIG. 2 shows a part of the gas-turbine group, namely the part which includes the sequential combustion. Compressed air flows out of a compressor system (not shown) into a premixing burner 3, as disclosed by U.S. Pat. No. 4,932,861 to Keller et al. which can be operated with a fuel 2. This publication forms an integral part of this description. The initial generation of hot gases then takes place in a high-pressure combustion chamber 4 designed as an annular combustion chamber. Operating downstream of this high-pressure combustion chamber 4 is a first turbine, a high-pressure turbine 5, in which the hot gases 6 generated in the high-pressure combustion chamber 4 undergo partial expansion. It is apparent in this connection that, upstream of the moving-blade row of the high-pressure turbine 5, a guide-blade row 7 acts at the end of the high-pressure combustion chamber 4. The said partial expansion is characterized by the fact that the exhaust gases 8 from the high-pressure turbine 5 still have a relatively high temperature. Accordingly, the said high-pressure turbine 5 consists of few moving-blade stages, preferably one to three stages. Acting downstream of the high-pressure turbine 5 is a second combustion chamber, a low-pressure combustion chamber 9, which functions according to a self-ignition principle. The low-pressure combustion chamber 9 essentially has the form of an annular duct through which flow occurs and in which preferably a gaseous fuel 10 is injected. Self-ignition of the injected fuel 10 takes place starting at a temperature of the exhaust gases 8 from the high-pressure turbine 5 of 850° C. The low-pressure combustion chamber 9 is in principle subdivided into a premixing zone 11 and a combustion zone 12, this premixing zone 11 having a row of vortex elements (not shown) which help to prevent backflow of the flame front. The low-pressure combustion chamber 9 has a number of fuel lances 16 roughly at the end of the premixing zone 11, which fuel lances 16 are distributed over the periphery and assume the function of injecting the fuel 10. The low-pressure turbine arranged downstream of the low-pressure combustion chamber 9 is not shown. The entire configuration of the gas-turbine group, excluding the generator, is mounted on a single common rotor shaft 13, as the axis 14 is intended to show. Advantageous in this respect is the fact that the covering can be produced with the aid of a single casing 15. The only apertures in the same are formed by the leadthroughs for the fuel lances 16. In order to avoid further apertures in the casing 15, the thermocouples 17 for recording the temperature of the exhaust gases 8 in the low-pressure combustion chamber 9 are fitted in the fuel lances 16. The leadthrough of the fuel lance 16 at the same time serves as an inlet for temperature-measuring lines 18, the signals of which are then analyzed in a measuring/control system 19 in order to then formulate corresponding commands for the fuel control 20. Along with the practical advantages of simultaneously utilizing the fuel lance 16 to accommodate the thermocouples 17, which manifests itself in an especially advantageous manner in particular in the absence of additional apertures in the casing 15 as well as during the replacement of defective thermocouples 17, that is, regarding installation and dismantling, this measuring point at the same time forms an optimum temperature gradient in the low-pressure combustion chamber 9. In principle, the temperature of the hot gases 6 has no direct thermodynamic limit; on the contrary, this limit is primarily predetermined by the high-pressure turbine 5 to be acted upon and its machine elements. In addition, the premixing zone 11 must have relatively intense cooling so that the possible imponderables from this process can also be taken into account for fuel control via the temperature recording in the low-pressure combustion chamber 9. The proposed point for the temperature measurement, which is where the fuel is injected in the hot exhaust gases, is directly in front of the self-ignition point in the low-pressure combustion chamber 9 and records the temperature of the exhaust gases 8 which is actually present there and thus immediately reveals whether this temperature will permit self-ignition at all, which is decisive for the sequential combustion described here. Too high or too low a temperature of the exhaust gases 8 can be corrected by dynamic fuel control of the high-pressure combustion chamber 4, in which case too high a temperature of the hot gases 6 formed in the high-pressure combustion chamber 4 can develop an effect which is no less damaging on the high-pressure turbine 5 and on the premixing zone 11 of the low-pressure combustion chamber 9. In addition, another advantageous effect can be achieved with this principle: by the thermocouples 17 each being allocated to a fuel lance 16, individual temperature monitoring can be practiced for each burner formed by the fuel lance 16, which temperature monitoring is then able to initiate specific control of the fuel 10. Thus targeted fuel control of the individual combustion actions can be achieved with single temperature monitoring at a point of average thermal loading.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas-turbine group for self-ignition of a fuel, comprising:

a compressor unit, a first combustion chamber arranged downstream of the compressor unit, a first turbine arranged downstream of the first combustion chamber, a second combustion chamber arranged downstream of the first turbine, a second turbine arranged downstream of the second combustion chamber, at least one generator, wherein the second combustion chamber includes a plurality of fuel lances distributed over a periphery of an interior of the second combustion chamber, and a thermocouple disposed in at least one fuel lance for recording a gas temperature in the second combustion chamber.

2. The gas-turbine group as claimed in claim 1, further comprising means for controlling a fuel supply to the first combustion chamber, said means being operatively connected to receive the temperature recorded by the thermocouple and to adjust the fuel supply responsive to said temperature.

3. The gas-turbine group as claimed in claim 1, further comprising means for controlling a fuel supply to the second combustion chamber, said means operatively connected to receive the temperature recorded by the thermocouple and to adjust the fuel supply responsive to said temperature.

\* \* \* \* \*